(12) United States Patent
Ferenczi et al.

(10) Patent No.: US 6,321,130 B1
(45) Date of Patent: Nov. 20, 2001

(54) DEVICE FOR CONTROLLING AN INSTALLATION HAVING MEMORY FOR STORING PLURALITY OF PARAMETERIZED TASKS ACTING ON DATA CONCERNING THE OPERATION OF THE INSTALLATION

(75) Inventors: Laurent Ferenczi, Paris; Patrick Bacot, Meudon; Bertrand Oresve, Paris, all of (FR)

(73) Assignee: L'Air Liquide, Societe Anonyme pour l'Etude et l'Exploitation des Procedes George Claude, Paris Cedex (FR)

( * ) Notice: Subject to any disclaimer, the term of this patent is extended or adjusted under 35 U.S.C. 154(b) by 0 days.

(21) Appl. No.: 09/105,198

(22) Filed: Jun. 26, 1998

(30) Foreign Application Priority Data

Jun. 26, 1997 (FR) .................................................. 97 08030

(51) Int. Cl.$^7$ ...................................................... G06F 19/00
(52) U.S. Cl. ................................. 700/95; 700/80; 700/96; 700/108
(58) Field of Search ................................ 700/28, 95, 96, 700/108, 80; 711/100

(56) References Cited

U.S. PATENT DOCUMENTS

| | | | |
|---|---|---|---|
| 4,562,545 | * 12/1985 | Hasegawa | 701/115 |
| 4,654,806 | * 3/1987 | Poyser et al. | 364/551.01 |
| 5,586,038 | 12/1996 | Nagaoka . | |
| 5,602,757 | * 2/1997 | Haseley et al. | 702/56 |
| 5,659,781 | * 8/1997 | Larson | 712/11 |
| 5,838,570 | * 11/1998 | Barea | 700/143 |
| 5,892,690 | * 4/1999 | Boatman et al. | 364/528.11 |

FOREIGN PATENT DOCUMENTS

| | | |
|---|---|---|
| 0 378 465 | 7/1990 | (EP) . |
| 2 247 757 | 3/1992 | (GB) . |
| 2 274 521 | 7/1994 | (GB) . |
| WO 90/16048 | 12/1990 | (WO) . |

* cited by examiner

*Primary Examiner*—Thomas Lee
*Assistant Examiner*—Thuan Du
(74) *Attorney, Agent, or Firm*—Young & Thompson

(57) ABSTRACT

The device (1) for controlling an installation (2) comprising means (9,10,11,12,13, for monitoring and/or commanding the operation of the installation (2), and a central data processing unit (14) adapted to communicate with the means for monitoring and/or commanding (9,10,11,12,13) for reading, sending and/or processing the data concerning the operation of the installation. The central unit (14) comprises memory means (16) for storing at least one parameterized task acting on said data concerning the operation of the installation, memory means storing at least one table, each table being associated with a parameterized task and comprising values of parameters of the considered task, for executing the latter, and, connected to each memory means (16,17), means (15) for executing said parameterized tasks by using said values stored in said table or tables when executing said parameterized tasks.

23 Claims, 2 Drawing Sheets

DEVICE FOR CONTROLLING AN INSTALLATION HAVING MEMORY FOR STORING PLURALITY OF PARAMETERIZED TASKS ACTING ON DATA CONCERNING THE OPERATION OF THE INSTALLATION

BACKGROUND OF THE INVENTION

1. Field of the Invention

The invention relates to a device for controlling an installation comprising means for monitoring and/or commanding the operation of said installation, and a central unit connected to said means for monitoring and/or commanding the operation for reading, sending and/or processing data concerning the operation of the installation.

2. Description of the Related Art

Control devices are known for monitoring and commanding the operation of antonomous installations such as for example nitrogen generators equipped with a safety liquid nitrogen tank.

Such a known device comprising, on one hand, means for measuring parameters relating to the operation of the installation, such as for example a level sensor or a device for monitoring the generator, and commanding means for acting on the operation of the installation as a function of the results of the measurement and, on the other hand programmed automaton connected to each of said measuring and commanding means.

The automaton comprises communication means permitting for example the transmission of a warning signal to a remote monitoring centre of a supplier for initiating the replenishing of the tank or for warning the supplier of a disfunction of the generator he put at the disposal of his client.

For this purpose, the automaton is programmed in such manner that it executes a certain number of tasks for reading, sending and/or processing data relating to the operation of the installation.

Such tasks comprises for example the reading of measurement values delivered by the sensors, the comparison of the measured values with predefined thresholds for determining the alarms to be set off or the initiation of alarm procedures consisting in transmitting the alarms to a remote monitoring centre of the supplier.

These known control devices have the drawback that each automaton is specifically adapted to a particular installation. This adaptation of the automaton concerns both its electric and/or electronic structure and the tasks to execute so that two automatons for controlling the operation of two installations of different types cannot be interchanged.

Consequently, a supplier who puts at the disposal of his clients installations of different types each one of which requires a specifically adapted control device, must invest a considerable amount of money for the development and manufacture of the installations.

Further, once it is installed, such a known control device lacks flexibility in use since, in order to add later measuring sensors and/or commanding transducers in order to refine the control of the installation or monitor a new module subsequently integrated in the installation, it is usually necessary to replace the automaton of the device by another.

SUMMARY OF THE INVENTION

An object of the present invention is to overcome these various drawbacks by providing a device for controlling an installation which provides greater flexibility as concerns adaptation to installations of different types and which permits subsequently adapting it in order to be capable of monitoring and/or commanding for example an additional new module of the installation.

For this purpose, the invention provides a device for controlling an installation, comprising means for monitoring and/or commanding the operation of said installation, and a central data processing unit adapted to communicate with said monitoring and/or commanding means for reading, sending and/or processing data concerning the operation of the installation, characterized in that the central unit comprises memory means for storing at least one parameterized task acting on said data concerning the operation of the installation, memory means for storing at least one table, each table being associated with a parameterized task and comprising values of the parameters of the considered task for executing the task, and, connected to each memory means, means for executing said parameterized tasks by using said values stored in said table or tables when executing said parameterized tasks.

The device according to the invention may also have one or more of the following features:

- at least one value of a parameter of a parameterized task is a pointer,
- it comprises, connected to the means for executing the tasks, a memory of an order in which the parameterized tasks must be executed in a closed loop and defining a general control task,
- a parameterized task comprises requests for the reading of data by said means for monitoring and/or commanding the operation of said installation,
- a parameterized task comprises actuators for said monitoring and/or commanding means,
- it comprises means for storing a history of data read by the monitoring and/or commanding means, and at least one parameterized task comprises the storing of said data in the storage means,
- at least one parameterized task comprises the activation of an alarm procedure,
- it comprises communication means for exchanging data relating to the operation of the installation with at least one centre remotely monitoring said installation and a parameterized task comprises the data transmission,
- the parameterized task for data transmission comprises the transmission of at least one alarm,
- the communication means comprise means for selecting data to be sent,
- said selecting means comprise means for executing a mathematic algorithm for the comparison of the data to be sent with the corresponding data which are available at the or each monitoring centre and means for inhibiting data transmission commanded by said means for executing the mathematical comparison algorithm,
- the central unit comprises means for executing programmed tasks and at least one parameterized task makes use of at least one programmed task,
- the means for executing the programmed tasks are connected to the data storage means for executing operations on data stored in the latter,
- it comprises a microcomputer comprising a memory for storing said tables and parameterized tasks, and at least one interface for coupling to said means for monitoring and/or commanding the operation of said installation and an interface for communication with the or each remote monitoring centre, and in which there is entered a program on one hand for carrying the programmed tasks and the parameterized tasks by using said parameterized values stored in said table or tables, and on the other hand for selecting the data to be sent.

BRIEF DESCRIPTION OF THE DRAWINGS

Further features and advantages of the invention will be apparent from the following description given merely by way of a non-limitative example with reference to the accompanying drawings win which.

DESCRIPTION OF THE PREFERRED EMBODIMENTS

Figure 1:
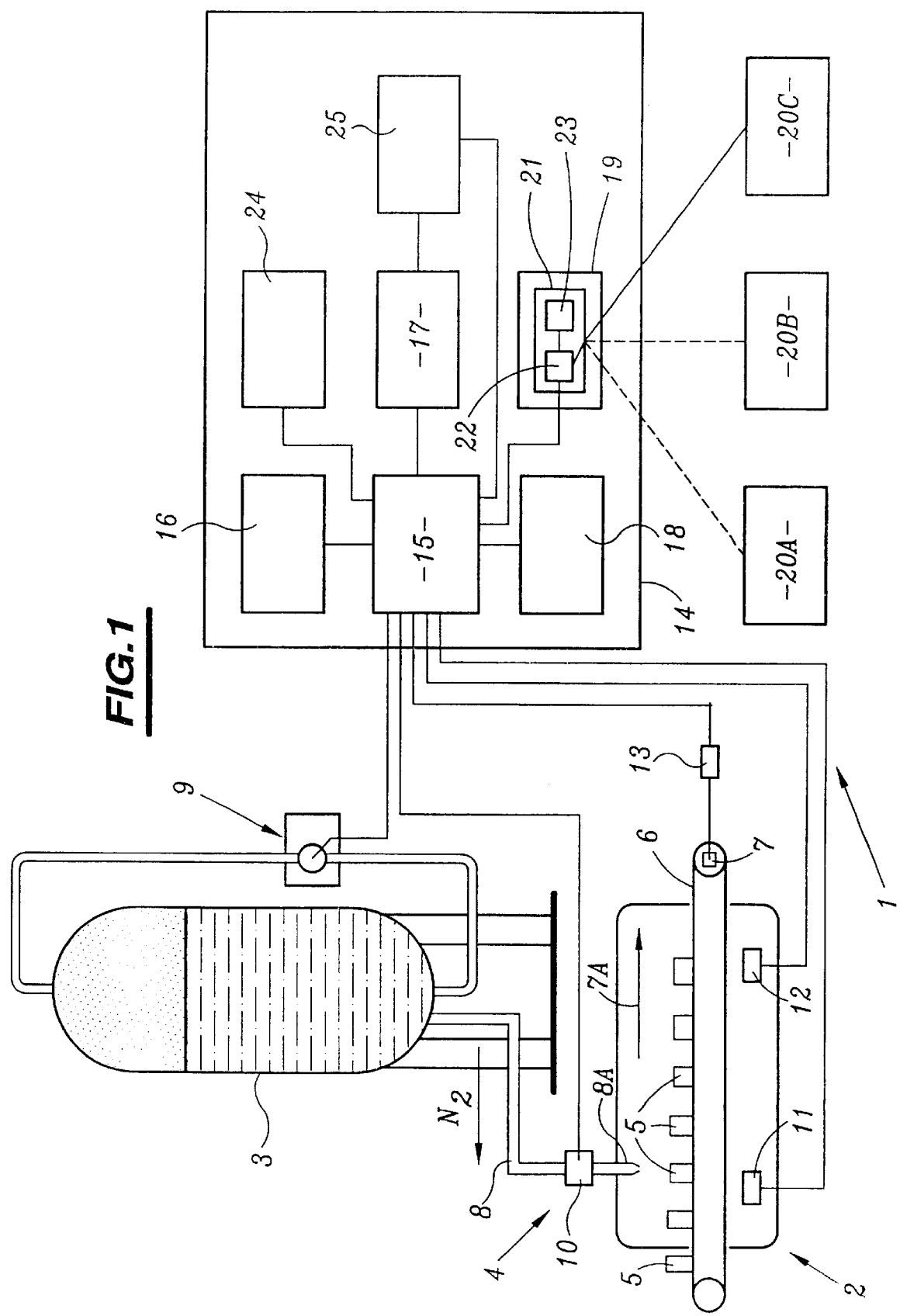
FIG. 1 is a block diagram of a refrigerating installation provided with a control device according to the invention and, FIG. 2 is a diagrammatic view of an example of tables of parameter values associated with parameterized tasks.

Shown in FIG. 1 is a control device 1 which is installed in an installation 2 for controlling the operation of the latter. The expression "control" is intended to mean on one hand the monitoring and on the other hand the command of the operation of the installation 2. For example, the installation 2 is a refrigerating installation for freezing or deep freezing food products.

This installation 2 is diagrammatically represented and comprises a liquid nitrogen tank 3 and a freezing tunnel 4 in which travel products 5 to be frozen on a conveyor belt 6 driven by a motor 7 in the direction of arrow 7A. The tank 3 is connected to the tunnel 4 by a pipe 8 whose end opening into the tunnel carries a liquid nitrogen sprayer 8A. In operation, a predefined quantity of liquid nitrogen is injected into the tunnel 4 for freezing the products 5.

The control device 1 comprises various means 9 to 13 for monitoring and commanding the operation of the freezing installation 2, namely a sensor 9 detecting the storage level of the liquid nitrogen contained in the tank 3, a sensor 10 of the rate of flow of the liquid nitrogen supplied to the tunnel 4, which is installed in the pipe 8, and two sensors 11 and 12 of the temperature prevailing in the tunnel 4 which are disposed respectively in the region of the sprayer 8A and the region of the exit of the tunnel 4. It further comprises a unit 13 regulating the motor 7 to modify the rate of travel of the conveyor belt 6 and consequently the time during which the products 5 stay in the tunnel 4.

The sensor 9 is for example a differential pressure sensor, and the sensor 10 is a Vortex flow meter. The sensors 11 and 12 are for example platinum temperature probes of the PT100 type.

The signals delivered by the means 9 to 13 may be of any suitable type. For example, the sensors 9 and 10 are of the type delivering an analog measurement signal of a value between 4 and 20 mA while the sensors 11 and 12 are of the type delivering a digital measurement signal.

Further, the device 1 comprises a central unit 14 connected to each of the monitoring and commanding means 9 to 13 for reading, sending and/or processing data relating to the operation of installation 2.

For this purpose, the unit 14 comprises means 15 for executing parameterized tasks and, connected to the latter, memory means 16 for storing these parameterized tasks and memory means 17 for storing tables of values of the parameters associated with the parameterized tasks. The means 15 further comprise inputs/outputs each of which is connected to the monitoring and commanding means 9 to 13.

The means 15 comprise for example a microcontroller or microcomputer. The memory means 16 are either a hard disk or a memory of the flash-EPROM type. The memory means 17 is for example a hard disk or a memory of the static RAM type.

As will be described in more detail hereinafter, the values of the parameters are for example means of variables, numbers such as for example an alarm threshold, arithmetic operators or any other data relating to a parameter of a parameterized task and necessary for its execution.

Further, the unit 14 comprises, connected to the executing means 15, a memory 18, for example of the RAM type, for storing an order of the parameterized tasks in which the tasks must be executed in a closed loop and defining a general task for the continuous control of the installation 2.

In order to enable a supplier to effect a remote control of the installation 2 at a distance, the central unit 14 is also provided with communication means 19 connected to the executing means 15 and adapted to exchange data relating to the operation of the installation 2, such as measurement values or alarms, with different remote monitoring centres 20A and 20B of the supplier, each one specialized in one aspect of the control of the installation 2. The centre 20A is for example specialized in the monitoring and the command of the temperature prevailing in the tunnel 4 and/or the speed of travel of the conveyor belt passing there through while the centre 20B is specialized in the monitoring of the storage level of the liquid nitrogen in the tank 3. The centres 20A and 20B are connected to the telecommunication means 19 by the fixed or mobile telephone network. Further, the means 19 are adapted to communicate with a station 20C for interrogating the state of operation of the installation 2 which is disposed at the client's place close to the installation 2 by a wire or radio connection of standard RS485.

The telecommunication means 19 are for example communication gates of standard RS485 or Modem of the PCMC1A format or the like.

Of course, the control of the installation 2 may also be effected by a single remote monitoring centre, but specialization has been found for example judicious in the case where the supplier puts at the disposal of his clients installations of different types several of which comprise a common module such as a liquid nitrogen storage tank. In this case, in order to coordinate deliveries, it is preferable that a single centre be in charge of the monitoring of the storage levels in the different tanks and of the replenishing of the latter in the event of the reception of a replenishing order or command for all the similar installations of a given geographical region.

The communication of the central unit 14 with these centres 20A and 20B of the supplier occurs for example via a telephone network and the communication with the station 20C via a cabled connection. In view of the fact that telephone networks are vulnerable from the point of view of the cutting off of a communication and also from the point of view of the quality of the data transmission, the exchange of data with each centre 20A and 20B must be reduced to a minimum.

For this purpose, the communication means 19 are provided with means 21 for selecting the data to be sent to each centre 20A, 20B. These means 21 comprise on one hand means 22 for executing a mathematic comparison algorithm of data to be sent with the corresponding data available in each centre 20A, 20B, and on the other hand means 23 for inhibiting a transmission of data commanded by said means 22.

The mathematic comparison algorithm executed by the means 22 comprise for example a "casting out nines". In the case where "casting out nines" gives for the considered data available at each centre 20A, 20B a result identical to that obtained upon the application of the "casting out nines" to the data to be sent, the means 22 send to the means 23 a signal for inhibiting the transmission of the data. In the opposite case, the means 22 send to the means 23 a deactivating signal to permit the transmission of the data.

The central unit 14 is also provided with means 24 for storing data, such as a hard disk or a memory of the static RAM type. These data are in particular a data history read off the monitoring and/or communication means 9–13 for exploiting this data, for example a forecast management of the installation. The data stored in the means 24 constitute a data base reflecting the state of the installation 2, and may be interrogated by the centres 20A and 20B. By means of his interrogation station 20C, the client also has available an access for interrogating, at least partly, on the spot the data stored in the means 24.

Further, the unit 14 comprises means 25 for executing programmed tasks. A programmed task is intended to mean a task specific to the installation 2 which cannot be parameterized since it concerns for example a particular processing of a measurement value. The means 25 are connected to the executing means 15 and to the means 17 for storing the tables for for example changing dynamically the value of a parameter in a table according to a specific programmed task. Such a programmed task concerns for example the conversion of a measured voltage value into a value of another physical magnitude or the adjustment of an interval of time between two temperature measurement instants. It may also concern the result of the integration with respect to time of a flow which is compensated by a multiplying factor depending on the temperature so as to obtain the equivalent volume of gas at a standard temperature.

The executing of a programmed task is for example initiated by a parameterized task following on the detection of an event at predetermined intervals of time, or continuously.

Further, the means 25 for executing programmed tasks are also connected to the data storage means 24 for executing specific operations on the data stored in these means 24.

The central unit 14 comprises for example a microcomputer provided with one or more modems adapted to communicate with the centres 20A and 20B via a telephone network and with the station 20C via a cabled or ratio connection, and interfaces for exchanging data with the means 9 to 13. The microcomputer further comprises a memory for storing said tables and the parameterized tasks and a processor for executing with an adapted time sharing the parameterized tasks but also the programmed tasks.

There will be explained hereinafter in an exemplary manner the operation of the control device with the aid of the sensors 9 to 12. For the command means, such as the unit 13 regulating the driving motor 7, the device 1 operates in the corresponding manner.

A parameterized task which is stored in the means 16 and must be executed by the means 15, concerns the acquisition, at predefined intervals of time, the measurement values delivered by each of the sensors 9 to 12. This parameterized task named "acquisition of measurement values" is for example in the following form:
Acquire the measurement value of the variable named X relative to the sensor connected at Y which delivers a signal of type Z, and record the acquired value in a place of the memory having the address M.

where
the parameter X is the name of a variable such as N for the storage level in the tank 3 read by the sensor 9, D for the rate of flow of liquid nitrogen in the pipe 8, $T_1$ for the temperature measured by the sensor 11 and $T_2$ for the temperature measured by the sensor 12, the parameter Y is the address of one of the sensors 9 to 12 and corresponds to an input of the means 15, the parameter Z indicates the type of signal to be acquired, for example an analog signal, in which case a conversion to a digital value must be effected by the means 15 with an integrated analog-digital convertor, or digital, the parameter M corresponds to an address of a place in the memory of the storage means 24 in which the acquired value must be recorded.

Figure 2:
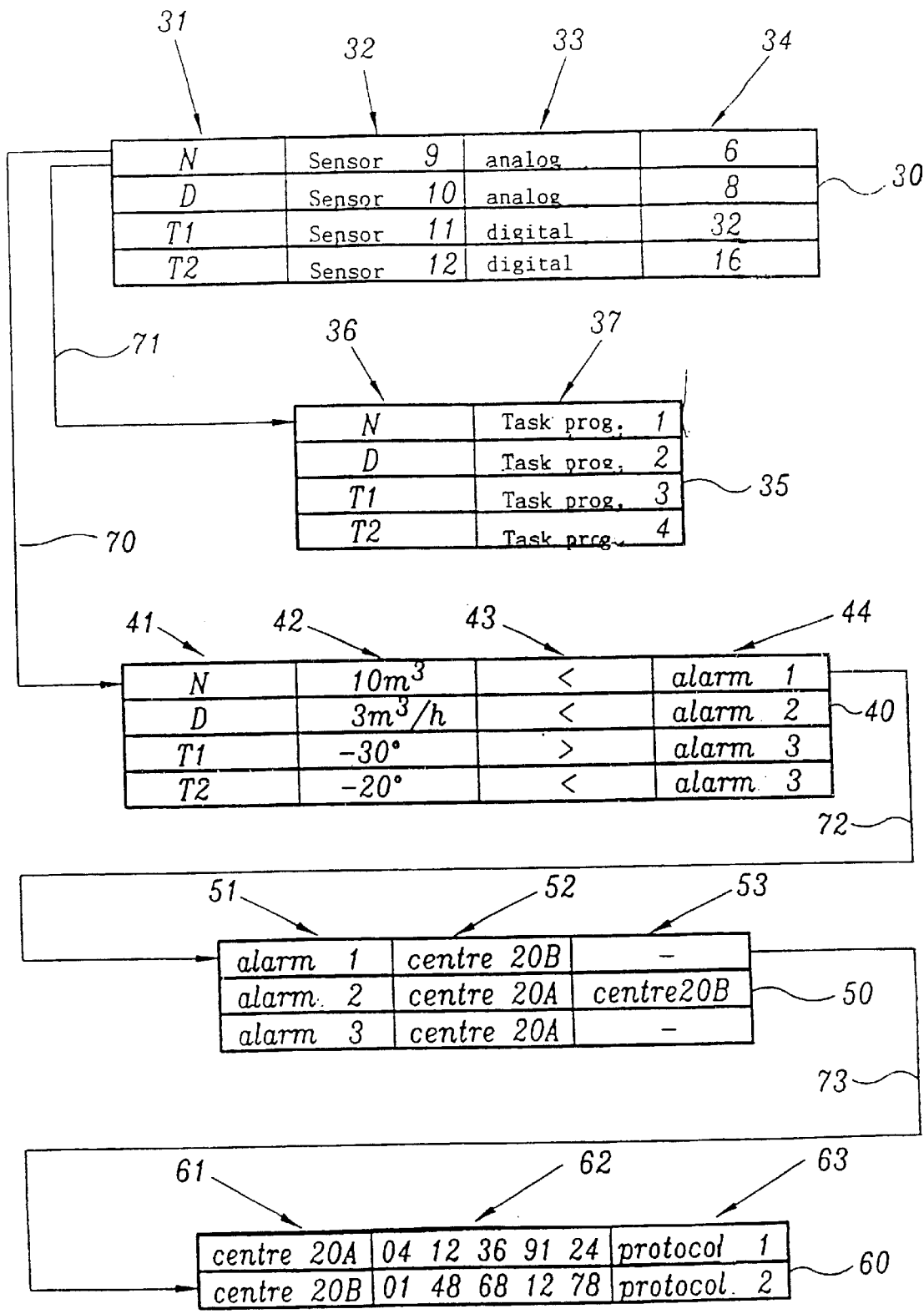

The values of the parameters X,Y,Z and M are recorded in the memory means 17 in the form of a table 30 associated with the aforementioned parameterized task shown in FIG. 2.

The table 30 has four columns 31 to 34 or more in which are respectively shown the values of the parameters X,Y,Z and M such as they were previously defined in respect of the parameterized task "Acquisition of measurement values". Each line of the table 30 is associated with one of the sensors 9 to 12.

To effect the acquisition and the recording of all the measurement values of the sensors 9 to 12, the means 15 execute the aforementioned parameterized task in taking the values of the parameters X,Y,Z and M of the table 30 of each line, from the first to the last.

Such a parameterized task has the advantage that in the case of a modification of the installation to be controlled, for example the installation of an additional sensor, the device 1 can be easily adapted.

Such a modification can be made in the following manner. After having installed the additional sensor in the installation to be controlled and connected an output of the additional sensor to an input of the executing means 15, it is sufficient to add a line corresponding to the table 30 in which are declared the specific values of the parameters of the additional sensor.

Once these have been declared, the means 15 execute the parameterized task "acquisition of the measurement values" from the first to the last line of table 30 and take into account the values of the parameters of the new additional sensor.

Further, the control device 1 is easily adapted to any type of installation since the measurement sensors and the command transducers employed for monitoring and/or commanding the operation of an installation are usually of the type delivering a voltage corresponding to the value of a measured physical magnitude, or receiving a voltage or a current corresponding to a regulation command. For each type of installation, it is sufficient to store the parameterized task "acquisition of the measurement values" in the means 16 and to declare for each sensor the required values of the parameters defined in a table associated with this parameterized task and stored in the means 17.

FIG. 2 shows by way of example other tables 35, 40, 50 and 60 associated with other parameterized tasks. Thus, the table 35 relates to the processing of measurement values acquired in the course of the execution of the parameterized task "acquisition of measurement values" and employs programmed tasks. The table 35 has two columns 36 and 37 in which are shown respectively the names of the measured variables and the names of the programmed tasks to be initiated. The programmed tasks "task prog. 1 to 4" are for example functions of conversion of the digital values stored at the locations of the memory indicated in column 34 of table 30. Advantageously, these functions take into account the individual characteristics of each sensor. Indeed, even two identical sensors such as the temperature sensors 11 and 12, may have different calibration curves. These calibration curves are taken into account by the application, to the value directly read by these sensors, of a specific programmed task. For example, the storage level N had been acquired in the form of a voltage delivered by the sensor 9 and stored in a digital form at the location of the memory carrying the address 6 of the storage means 24. Upon the execution of the first line of the parameterized task relating to table 35, this voltage value is converted into "$m^3$" by means of the programmed task "task prog. 1" which takes into account the calibration curve of the sensor 9, and recorded at the memory location carrying the address 6.

Table 40 relates to a parameterized task for comparing values converted when executing the parameterized task relating to table 35, at predefined thresholds for the purpose of a possible activation of an alarm procedure. The table 40 has four columns 41 to 44 in which are shown respectively the values of parameters such as the name of the measured variable, a predetermined threshold, an arithmetic comparison operator and the name of the variable of an alarm procedure which takes the value "1" if the alarm procedure in question must be activated, and "0" in the case of a negative comparison result.

For example, in the first line of table 40, it concerns the comparison of the storage level N of the tank 3 with a predefined threshold equal to 10 $m^3$. If it is lower or equal to 10 $m^3$, the variable named "alarm 1" takes the value "1" and a corresponding alarm procedure must be activated.

Table 50 relates to the alarm procedures "alarms 1 to 3" which must be actuated in accordance with the comparison results obtained when executing the comparison parameterized task associated with table 40. Table 50 has three columns 51, 52 and 53. In the first column 51 is shown the variable name of the alarm procedure and in the second column 52 and in the third column 53 are shown the names of the remote monitoring centers which must be called in the case of activation of one of the "alarms 1 to 3".

Table 50 has the feature that, when it is employed, it makes use of a parameterized "subtask" for calling each remote monitoring centre 20A and 20B whose values of the parameters are defined in table 60. Table 60 has three columns 61, 62 and 63 in which are shown respectively the names of the centres to be called, a telephone number and a data exchange protocol.

Preferably, certain parameter values declared in tables 30, 35, 40, 50 and 60, in particular those which are declared in a plurality of tables at a time, such as the names of the measurement variables or the names of the variable of the alarm procedures, are pointers. Thus, two tables relating to two different parameterized tasks have access to common parameter values by using the same memory location. This manner of declaring the values of the parameters permits creating a connection between these different tables 30, 35, 40, 50 and 60. Thus a modification of the name N is repeated in all the tables where N appears.

As an example, the connection between the tables 30, 35, 40, 50 and 60 for the monitoring of the storage level N in the tank 3, are shown by the arrows 70, 71, 72 and 73. In the case where the read value N converted into "$m^3$" by the sensor 9 is lower than 10 $m^3$, the alarm 1 must be activated which consists in transmitting an alarm to the centre 20B. The alarm is transmitted by calling the telephone number 0148 68 1278 in using the protocol 2.

Advantageously, a task for the continuous control of the installation is defined by the order in which the parameterized tasks must be executed in a closed loop, which is stored in the memory 18. This order consists for example in executing first of all the parameterized task associated with table 30, then those associated with tables 35 and 40 and lastly that associated with table 50 with the sub-task associated with table 60.

When controlling the installation 2, the executing means 15 take into account each parameterized task one by one in this predefined order, and each task is executed by taking into account, line by line, the values of the parameters of the table associated with the considered parameterized task.

Another parameterized task comprises for example instructions intended for the monitoring and/or commanding means 9 to 13 for the regular storage of data revealed by the means 9 to 13 in the storage means 24 so as to constitute a data history.

The data recorded in the storage means 24 may be interrogated at a distance by one of the centres 20A, 20B of the supplier or by the client by means of the interrogation centre 20C.

When transmitting data, such as measurement values to one of the centres 20A, 20B, the selecting means 21 reduce the exchange of data to be sent so as to render the transmission of data between the device 1 and each of the centres 20A, 20B more reliable.

For this purpose, the means 22 apply the mathematic comparison algorithm both to the data to be sent and to the corresponding data stored at the centres 20A and 20B. Depending on the result of the comparison, the means 22 send or do not send to the means 23 a signal for inhibiting the transmission of the data.

For example, as concerns the value of the temperature $T_1$, the latter is only sent to one of the centres 20A, 20B if the "casting out nines" applied to the temperature $T_1$, stored at the centres 20A, 20B gives a result different from that obtained upon the application of the "casting out nines" to the temperature to be sent. It is therefore presumed that its value has changed since its last transmission.

Advantageously, another parameterized task comprises the transmission of data at regular intervals of time to each remote monitoring centre 20A, 20B. These data are for example employed by the supplier for invoicing the client.

What is claimed is:

1. Device controlling an installation, comprising in combination, means for monitoring and/or commanding the operation of said installation, and a central data processing unit adapted to communicate with said means for monitoring and/or commanding for reading, sending and/or processing data concerning the operation of said installation, said central unit comprising memory means for storing at least one parameterized task acting on said data concerning the operation of said installation, at least one of the parameters of said at least one parameterized task being the address of one of the means for monitoring and/or commanding the operation of said installation, memory means for storing at least one table, each at least one table being associated with a parameterized task and comprising values of the parameters of the considered task for executing said task, and connected to each memory means, means for executing said parameterized tasks by using said values stored in said at least one table when executing said parameterized tasks.

2. Control device according to claim 1, wherein at least one value of a parameter of a parameterized task is a pointer.

3. Control device according to claim 1, comprising, connected to said means for executing said tasks, a memory of an order in which said parameterized tasks must be executed in a closed loop and defining a general control task.

4. Control device according to claim 1, wherein a parameterized task comprises requests for the reading of data by said means for monitoring and/or commanding the operation of said installation.

5. Control device according to claim 1, wherein a parameterized task comprises commands for said monitoring and/or commanding means.

6. Control device according to claim 1, comprising means for storing a history of data read by said monitoring and/or commanding means, and at least one parameterized task comprises the storing of said data in said storage means.

7. Control device according to claim 1, wherein at least one parameterized task comprises the actuation of an alarm procedure.

8. Control device according to claim 1, comprising communication means for exchanging data relating to the operation of said installation with at least one centre remotely monitoring said installation, and a parameterized task comprises the data transmission.

9. Control device according to claim 8, wherein the parameterized task for the data transmission comprises the transmission of at least one alarm.

10. Control device according to claim 8, wherein said communication means comprise means for selecting data to be sent.

11. Control device according to claim 10, wherein said selecting means comprise means for executing a mathematical algorithm for the comparison of the data to be sent with the corresponding data which are available in said at least one monitoring centre and means for inhibiting a data transmission controlled by said means for executing said mathematical comparison algorithm.

12. Control device according to claim 1, wherein said central unit comprises means for executing programmed tasks and at least one parameterized task makes use of at least one programmed task.

13. Control device according to claim 12, wherein said means for executing said programmed tasks are connected to said data storage means for executing operations on the data stored in said data storage means.

14. Control device according to claim 12, comprising a microcomputer comprising a memory for storing said tables and parameterized tasks, and at least one interface for coupling to said means for monitoring and/or commanding the operation of said installation, and an interface for communication with at least one remote monitoring centre, and in which microcomputer there is entered a program on one hand for executing the programmed tasks and the parameterized tasks by using said parameterized values stored in said at least one table, and on the other hand for selecting the data to be sent.

15. Control device according to claim 13, comprising a microcomputer comprising a memory for storing said tables and parameterized tasks, and at least one interface for coupling to said means for monitoring and/or commanding the operation of said installation, and an interface for communication with at least one remote monitoring centre, and in which microcomputer there is entered a program on one hand for executing the programmed tasks and the parameterized tasks by using said parameterized values stored in said at least one table, and on the other hand for selecting the data to be sent.

16. Control device according to claim 1, wherein at least one of the tables associated with a parameterized task comprises at least two different values for one of the parameters of the considered task.

17. Method for controlling an installation, by using in combination, means for monitoring and/or commanding the operation of said installation, and a central data processing unit adapted to communicate with said means for monitoring and/or commanding for reading, sending and/or processing data concerning the operation of said installation, the method comprising the steps of:

storing in said central unit at least one parameterized task acting on said data concerning the operations of said installation, storing in said central unit at least one table, each at least one table being associated with a parameterized task and comprising values of the parameters of the considered task for executing said task, at least one of the parameters of said at least one parameterized task being the address of one of the means for monitoring and/or commanding the operation of said installation, and, executing said parameterized tasks by using said values stored in said at least one table when executing said parameterized tasks.

18. Control method according to claim 17, wherein at least one value of a parameter of a parameterized task is a pointer.

19. Control method according to claim 17, wherein a parameterized task comprises requests for the reading of data by said means for monitoring and/or commanding the operation of said installation.

20. Control method according to claim 17, wherein a parameterized task comprises commands for said monitoring and/or commanding means.

21. Control method according to claim 17, comprising a step of storing a history of data read by said monitoring and/or commanding means, and at least one parameterized task comprises the storing of said data.

22. Control according to claim 17, wherein at least one parameterized task comprises the actuation of an alarm procedure.

23. Control method according to claim 17, wherein said central unit executes programmed tasks and at least one parameterized task makes us of at least one programmed task.

* * * * *